United States Patent
Lin

(10) Patent No.: US 12,025,884 B2
(45) Date of Patent: Jul. 2, 2024

(54) DISPLAY DEVICE AND MANUFACTURING METHOD THEREOF

(71) Applicant: AUO Corporation, Hsinchu (TW)

(72) Inventor: Yi-Ling Lin, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 17/958,432

(22) Filed: Oct. 3, 2022

(65) Prior Publication Data

US 2023/0333430 A1    Oct. 19, 2023

(30) Foreign Application Priority Data

Apr. 18, 2022  (TW) ................... 111114619
Aug. 2, 2022   (TW) ................... 111128922

(51) Int. Cl.
   *G02F 1/1337*   (2006.01)
   *C09K 19/04*    (2006.01)
   *C09K 19/38*    (2006.01)

(52) U.S. Cl.
   CPC .... *G02F 1/133788* (2013.01); *C09K 19/3857* (2013.01); *G02F 1/133715* (2021.01); *G02F 1/13378* (2013.01); *C09K 2019/0448* (2013.01)

(58) Field of Classification Search
   None
   See application file for complete search history.

(56) References Cited

U.S. PATENT DOCUMENTS

| | | | |
|---|---|---|---|
| 9,383,610 B2 | 7/2016 | Chen et al. | |
| 9,983,442 B2 | 5/2018 | Lim | |
| 2012/0133881 A1* | 5/2012 | Kubota | G02F 1/137 349/191 |
| 2015/0077679 A1 | 3/2015 | Chen et al. | |
| 2016/0282672 A1 | 9/2016 | Lim | |
| 2018/0188586 A1* | 7/2018 | Chen | G02F 1/13718 |
| 2020/0004058 A1* | 1/2020 | Harrold | G02B 6/0055 |

FOREIGN PATENT DOCUMENTS

| | | |
|---|---|---|
| CN | 204065623 | 12/2014 |
| CN | 106010577 | 10/2016 |
| CN | 110964543 | 4/2020 |
| TW | 201901263 | 1/2019 |
| WO | 2018206524 | 11/2018 |

* cited by examiner

*Primary Examiner* — Ryan Crockett
(74) *Attorney, Agent, or Firm* — JCIPRNET

(57) ABSTRACT

A display device includes a first substrate, a first alignment layer, a second substrate, a second alignment layer, and a display medium. The first alignment layer is disposed on the first substrate. The second substrate is disposed opposite to the first substrate. The second alignment layer is disposed on the second substrate, and the first and second alignment layers are located between the first and second substrates. The display medium is located between the first and second alignment layers, where a surface of the first alignment layer facing the display medium and a surface of the second alignment layer facing the display medium have topographies with irregular areas surrounded by micro-structures. Besides, a manufacturing method of the display device is also provided.

11 Claims, 8 Drawing Sheets

DISPLAY DEVICE AND MANUFACTURING METHOD THEREOF

CROSS-REFERENCE TO RELATED APPLICATION

This application claims the priority benefit of Taiwan application serial no. 111114619, filed on Apr. 18, 2022 and Taiwan application serial no. 111128922, filed on Aug. 2, 2022. The entirety of each of the above-mentioned patent applications is hereby incorporated by reference herein and made a part of this specification.

BACKGROUND

Technical Field

The disclosure relates to a photoelectric device and a manufacturing method thereof; more particularly, the disclosure relates to a display device and a manufacturing method thereof.

Description of Related Art

A reflective liquid crystal display has attracted market attention due to its advantages of saving energy and environmental protection. Bistable characteristics of liquid crystal (LC) molecules allow ambient light to be reflected by or pass through the display, which leads to a bright or dark ambient to achieve the purpose of display. Therefore, it is not required to additionally set a backlight source.

However, in the dark state, the existing reflective liquid crystal display may display a whitish color with a high haze level, thus resulting in poor display quality. In addition, the response time of the existing reflective liquid crystal display is excessively long, and thus it is unlikely to achieve active driving.

SUMMARY

The disclosure provides a display device which has improved transparency in a dark state and a reduced response time.

The disclosure further provides a manufacturing method of a display device, wherein a conventional printing process for forming an alignment layer may be omitted.

An embodiment of the disclosure provides a display device including a first substrate, a first alignment layer, a second substrate, a second alignment layer, and a display medium is provided. The first alignment layer is disposed on the first substrate. The second substrate is disposed opposite to the first substrate. The second alignment layer is disposed on the second substrate. The first alignment layer and the second alignment layer are located between the first substrate and the second substrate. The display medium is located between the first and second alignment layers, wherein a surface of the first alignment layer facing the display medium and a surface of the second alignment layer facing the display medium have topographies with irregular areas surrounded by micro-structures.

According to an embodiment of the disclosure, a diameter of the topographies with the irregular areas ranges from 20 µm to 700 µm.

According to an embodiment of the disclosure, a thickness of the first alignment layer or a thickness of the second alignment layer is less than or equal to 300 Å.

According to an embodiment of the disclosure, the microstructures are shaped as irregular curves.

According to an embodiment of the disclosure, lengths of the irregular curves range from 10 µm to 900 µm.

According to an embodiment of the disclosure, widths of the irregular curves range from 0.2 µm to 0.4 µm.

According to an embodiment of the disclosure, the microstructures comprise polymers or oligomers.

An embodiment of the disclosure provides a manufacturing method of a display device, and the manufacturing method includes following steps. A panel including a first substrate, a second substrate, and a display medium composition is provided, wherein the display medium composition is located between the first substrate and the second substrate, and the display medium composition includes a display medium and a polymerizable monomer. A heat treatment is performed on the panel, wherein a temperature at which the heat treatment is performed is higher than a temperature at which the display medium is transformed into an isotropic liquid. After the heat treatment is performed on the panel and a temperature of the panel is reduced, a light curing treatment is performed on the panel.

According to an embodiment of the disclosure, a speed of reducing the temperature of the panel is less than 7° C./min.

According to an embodiment of the disclosure, a temperature at which the light curing treatment is performed ranges from 20° C. to 60° C.

According to an embodiment of the disclosure, the light curing treatment is performed by applying non-polarizing light.

According to an embodiment of the disclosure, a wavelength of the non-polarizing light ranges from 200 nm to 450 nm.

According to an embodiment of the disclosure, light curing energy consumed in the light curing treatment ranges from 50 mW/cm$^2$ to 200 mW/cm$^2$.

According to an embodiment of the disclosure, a time period during which the light curing treatment is performed ranges from 50 seconds to 400 seconds.

According to an embodiment of the disclosure, a weight percentage of the polymerizable monomer in the display medium composition ranges from 0.2 wt % to 2.0 wt %.

According to an embodiment of the disclosure, the polymerizable monomer comprises an acrylate group and a phenyl group.

According to an embodiment of the disclosure, the polymerizable monomer is selected from following compounds or a combination thereof:

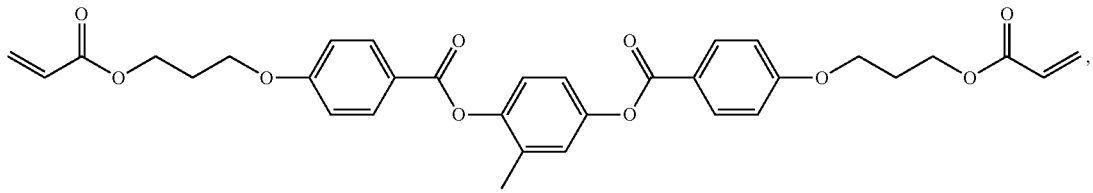 [SMILES: C=CC(=O)OCCCOc1ccc(C(=O)Oc2ccc(OC(=O)c3ccc(OCCCOC(=O)C=C)cc3)c(C)c2)cc1]

-continued

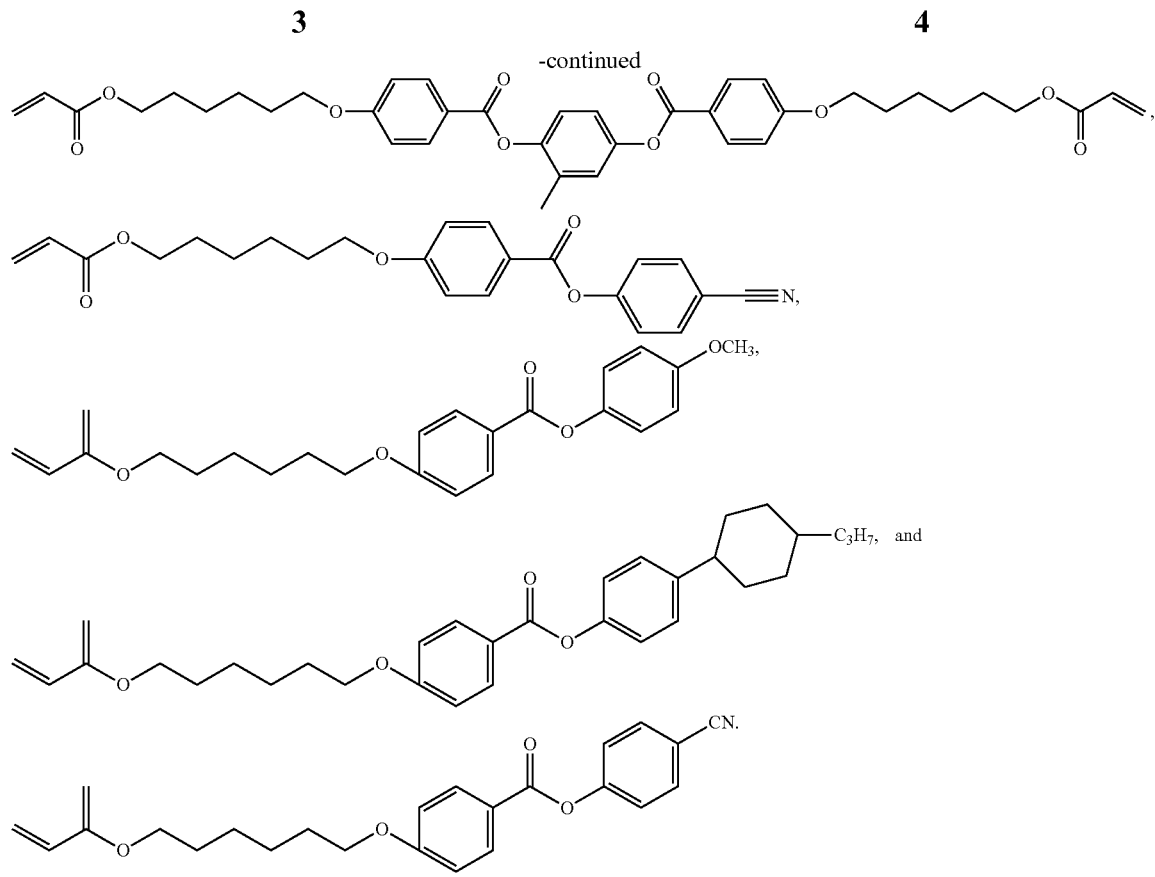

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
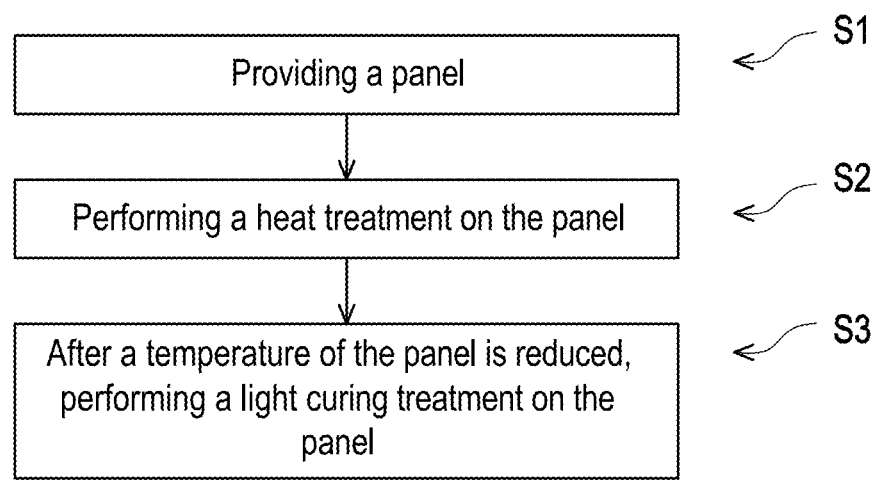
FIG. 1 is a flowchart of a manufacturing method of a display device according to an embodiment of the disclosure.

In the accompanying drawings, the thickness of layers, films, panels, regions, and so forth are enlarged for clarity. The same reference numbers refer to the same elements throughout the specification. It should be understood that when an element, such as a layer, a film, a region, or a substrate is referred to as being "on" or "connected to" another element, it can be directly on or connected to the another element, or an intermediate element may also be present. By contrast, when an element is referred to as being "directly on" or "directly connected to" another element, no intermediate element is present. As used herein, being "connected" may refer to a physical and/or electrical connection. Furthermore, being "electrically connected" or "coupled" may refer to the presence of other elements between the two elements.

It should be understood that, although the terminologies "first," "second," "third," and so forth may serve to describe various elements, components, regions, layers, and/or sections in this disclosure, these elements, components, regions, layers, and/or sections shall not be limited by these terminologies. These terminologies merely serve to distinguish one element, component, region, layer, and/or section from another element, component, region, layer, or section. Thus, a first "element," "component," "region," "layer," or "section" discussed below may be called as a second element, component, region, layer, or section without departing from the teachings herein.

The terminologies used herein are only for the purpose of describing particular embodiments and are not restrictive. As used herein, the singular forms "a," "an," and "the" are intended to include the plural forms including "at least one" or represent "and/or" unless the content clearly indicates otherwise. As used herein, the terminology "and/or" includes any and all combinations of one or more of the associated listed items. It should also be understood that when used in this disclosure, the terminologies "include" and/or "comprise" indicate the presence of the described features, regions, overall scenarios, steps, operations, elements, and/or components but do not exclude the presence or addition of one or more other features, regions, overall scenarios, steps, operations, elements, components, and/or combinations thereof.

Furthermore, relative terminologies, such as "lower" or "bottom" and "upper" or "top" may be used herein to describe the relationship between one element and another element, as shown in the drawings. It should be understood that relative terminologies are intended to encompass different orientations of the device in addition to the orientation shown in the drawings. For instance, if a device in one of the accompanying drawings is turned upside down, elements described as being on the "lower" side of other elements would then be oriented on the "upper" sides of the other elements. Thus, the exemplary terminology "lower" may include an orientation of being on the "lower" side and the "upper" side, depending on the particular orientation of the accompanying drawings. Similarly, if the device in one of the accompanying drawings is turned upside down, elements described as being "below" or "beneath" other elements would then be oriented "above" the other elements. Thus, the exemplary terminology "below" or "beneath" may encompass an orientation of being above and below.

Considering the particular amount of measurement and measurement-related errors discussed (i.e., the limitations of the measurement system), the terminology "about," "approximately," or "substantially" used herein includes the average of the stated value and an acceptable range of deviations from the particular value as determined by those skilled in the art. For instance, the terminology "about" may refer to as being within one or more standard deviations of the stated value, or within ±30%, ±20%, ±10%, or ±5%. Furthermore, the terminology "about," "approximately," or "substantially" as used herein may be chosen from a range of acceptable deviations or standard deviations depending on the optical properties, etching properties, or other properties, rather than one standard deviation for all properties.

Unless otherwise defined, all terminologies (including technical and scientific terminologies) used herein have the same meaning as commonly understood by persons of ordinary skill in the art. It will be further understood that terminologies, such as those defined in commonly used dictionaries, should be interpreted as having a meaning that is consistent with their meaning in the context of the relevant art and the disclosure and will not be interpreted in an idealized or overly formal sense unless expressly so defined herein.

Exemplary embodiments are described herein with reference to the cross-sectional schematic views illustrating idealized embodiments. Therefore, variations of shapes resulting from the manufacturing technologies and/or tolerances, for instance, are to be expected. Therefore, the embodiments described herein should not be construed as being limited to the particular shapes of regions as illustrated herein but are to include deviations in shapes that result from manufacturing, for example. For instance, regions shown or described as being flat may typically have rough and/or non-linear features. Besides, the acute angle as shown may be round. Therefore, the regions shown in the drawings are schematic in nature, and their shapes are not intended to show the exact shape of the regions, and are not intended to limit the scope of the claims.

Figure 2A:
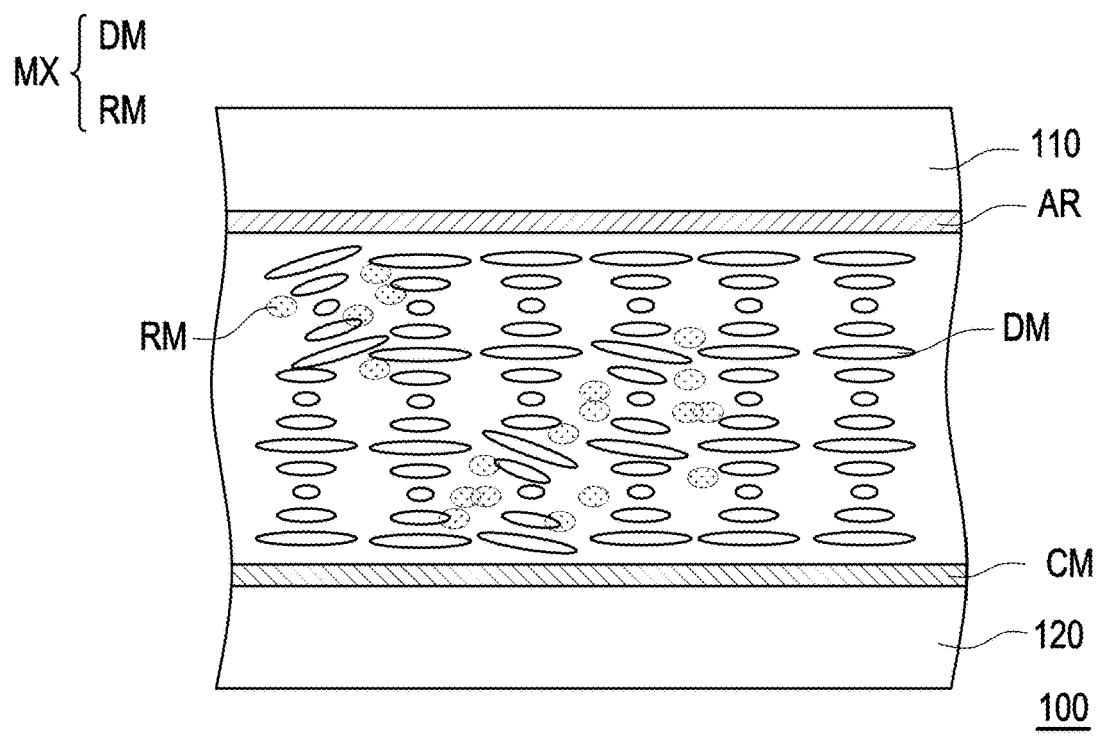
FIG. 2A to FIG. 2C are schematic cross-sectional views of steps in a manufacturing method of a display device according to an embodiment of the disclosure.
Figure 2B:
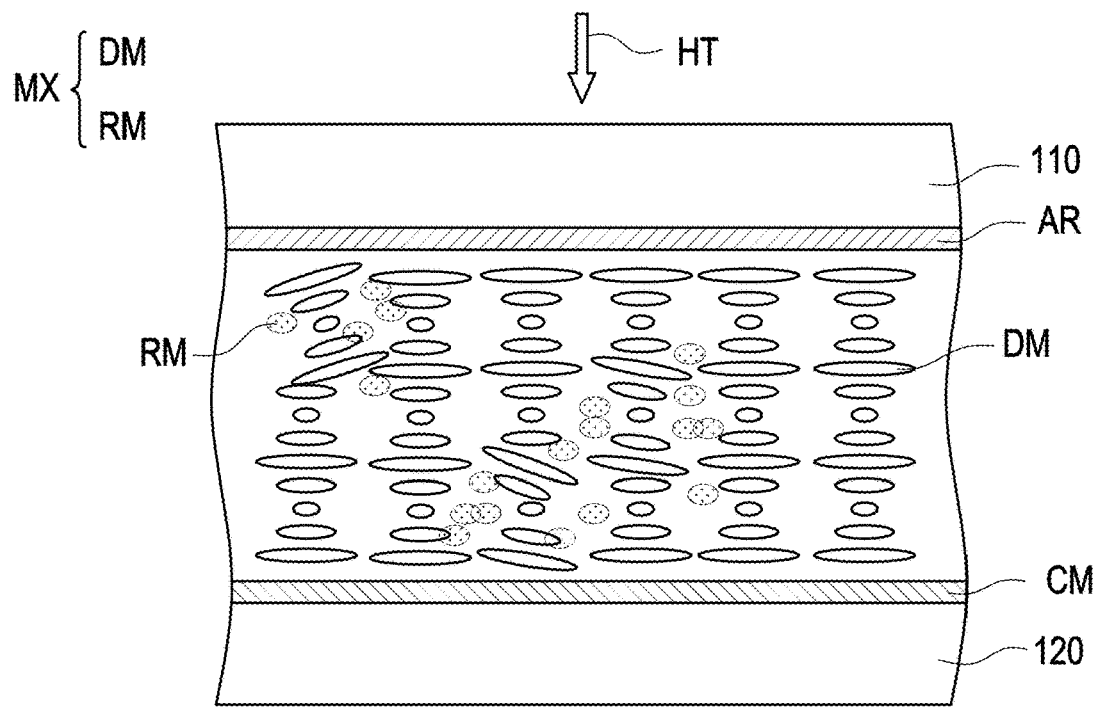
Figure 2C:
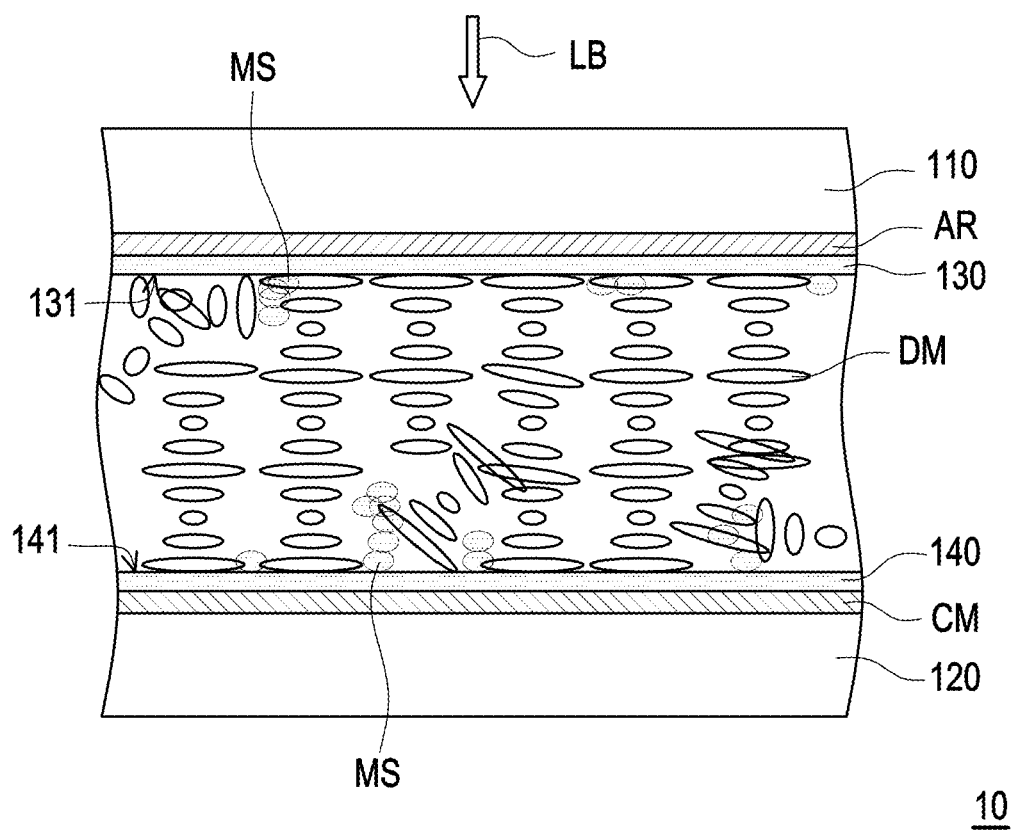

FIG. 1 is a flowchart of a manufacturing method of a display device according to an embodiment of the disclosure. FIG. 2A to FIG. 2C are schematic cross-sectional views of steps in a manufacturing method of a display device according to an embodiment of the disclosure. According to an embodiment, the manufacturing method of a display device 10 is exemplarily described hereinafter with reference to FIG. 1 and FIG. 2A to FIG. 2C.

In this embodiment, the manufacturing method of the display device 10 may include following steps. First, with reference to FIG. 1 and FIG. 2A, in step S1, a panel 100 is provided, and the panel 100 includes, for instance, a first substrate 110, a second substrate 120, and a display medium composition MX, wherein the display medium composition MX is located between the first substrate 110 and the second substrate 120, and the display medium composition MX may include a display medium DM and a polymerizable monomer RM.

In some embodiments, the panel 100 may be formed by forming a pixel array layer AR on the first substrate 110 first. Specifically, the first substrate 110 may be provided. A material of the first substrate 110 may be glass, quartz, an organic polymer, or any other appropriate material. Next, the pixel array layer AR may be formed on the first substrate 110 by performing a semiconductor manufacturing process. The pixel array layer AR at least includes a plurality of active elements (not shown), a plurality of pixel electrodes (not shown), a plurality of data lines (not shown), and a plurality of scan lines (not shown), wherein the active elements are, for instance, thin film transistors with sources, gates, and drains, the data lines may be electrically connected to the sources of the active elements, the scan lines may be electrically connected to the gates of the active elements, and the pixel electrodes may be electrically connected to the drains of the active elements, which should however not be construed as a limitation in the disclosure.

In some embodiments, the panel 100 may be further formed by forming a common electrode layer CM on the second substrate 120. A material of the second substrate 120 may be similar to the material of the first substrate 110, and details are not described again. In some embodiments, a color filter layer may be further formed on the second substrate 120 before the common electrode layer CM is formed, so that the display device 10 may achieve a full-color display effect.

The manufacturing process of the panel 100 may further include a step of preparing the display medium composition MX. For instance, the display medium DM may be mixed with the polymerizable monomer RM, so that the display medium composition MX includes the display medium DM and the polymerizable monomer RM. The display medium DM is, for instance, cholesteric liquid crystal.

The polymerizable monomer RM is a reactive monomer capable of polymerization while a light curing treatment is performed. In this embodiment, the polymerizable monomer RM may be selected from compounds listed in Table 1 below or a combination thereof, which should however not be construed as a limitation in the disclosure. In some embodiments, the polymerizable monomer RM may have a non-linear structure, and the polymerizable monomer RM may have a non-rigid structure. In some embodiments, the polymerizable monomer RM may include an acrylate group and a phenyl group. In some embodiments, the polymerizable monomer RM may include two or more phenyl groups, and the phenyl groups may be linked by a rotatable functional group, such as —O—C(=O)—, which should however not be construed as a limitation in the disclosure.

position MX may range from 0.4 wt % to 1 wt %; thereby, the panel 100 (as shown in FIG. 2C) subsequently formed may have a high transmittance (including but not limited to: 86.83%) and low haze (including but not limited to: 18.8%).

Next, the first substrate 110 and the second substrate 120 may be assembled together, and the display medium composition MX may fill between the pixel array layer AR of the first substrate 110 and the common electrode layer CM of the second substrate 120. For instance, a sealant (not shown) may be coated on the pixel array layer AR of the first substrate 110 or on the common electrode layer CM of the

TABLE 1

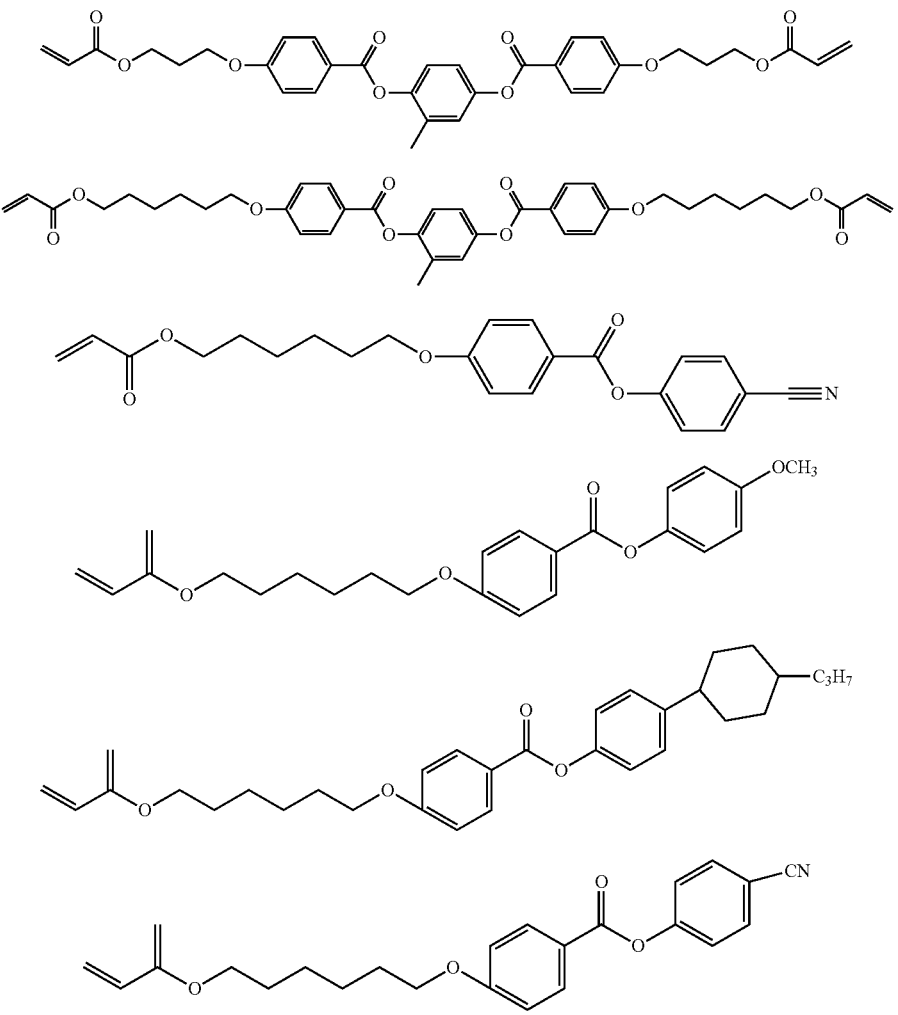

In this embodiment, a weight percentage of the polymerizable monomer RM in the display medium composition MX may range from 0.2 wt % to 2.0 wt %. Preferably, the weight percentage of the polymerizable monomer RM in the display medium composition MX may range from 0.2 wt % to 1 wt %, e.g., 0.3 wt %, 0.5 wt %, or 0.8 wt %, which should however not be construed as a limitation in the disclosure. The weight percentage of the polymerizable monomer RM may be determined by other parameters, such as a time period during which the light curing treatment is performed, energy consumed in the light curing treatment, and so on. In an embodiment, the weight percentage of the polymerizable monomer RM in the display medium comsecond substrate 120. After that, the display medium composition MX is dropped into the space enclosed by the pixel array layer AR or the common electrode layer CM and the sealant. Then, in a near-vacuum environment, one of the first substrate 110 and the second substrate 120 is made to approach the other of the first substrate 110 and the second substrate 120, so as to further adhere the first substrate 110 and the second substrate 120 through the sealant. As such, the display medium composition MX may be sealed between the pixel array layer AR of the first substrate 110 and the common electrode layer CM of the second substrate 120, and the fabrication of the panel 100 may be completed. In other words, the panel 100 may be formed by applying a one drop fill (ODF) method to fill the space in the panel 100 with the display medium composition MX, which should however not be construed as a limitation in the disclosure. In other embodiments, liquid crystal (LC) injection or other appropriate methods may also be applied to fill the space in the panel 100 with the display medium composition MX to form the panel 100.

Next, with reference to FIG. 1 and FIG. 2B, a heat treatment is performed on the panel 100 in step S2, wherein a temperature at which the heat treatment is performed is higher than a temperature at which the display medium DM is transformed into an isotropic liquid. For instance, the critical temperature for transforming the anisotropic display medium DM into the isotropic liquid is T° C. In this embodiment, the temperature at which the heat treatment is performed may be higher than or equal to T° C.+20° C., which should however not be construed as a limitation in the disclosure. Specifically, in this embodiment, the panel 100 may be placed into an oven, and a temperature in the oven may be preset to be higher than the temperature of transforming the display medium DM into the isotropic liquid, e.g., from 100° C. to 150° C. (such as 120° C.), so that the display medium composition MX may absorb heat energy HT supplied by the oven and may be transformed into the isotropic liquid.

Next, with reference to FIG. 1 and FIG. 2C, in step S3, after the heat treatment is performed on the panel 100 and after a temperature of the panel is reduced, a light curing treatment (i.e., a curing treatment) is performed on the panel 100. Specifically, in this embodiment, the temperature of the panel 100 may be reduced to be 60° C. or lower at a speed no more than 7° C./min (e.g., 5° C./min), and the light curing treatment is then performed on the panel 100 by applying a light beam LB at a temperature (e.g., 50° C.) ranging from 60° C. to a room temperature (e.g., 20° C.). After the light curing treatment is completed, the polymerizable monomer RM may be applied to form the first alignment layer 130 on the pixel array layer AR of the first substrate 110 and form the second alignment layer 140 on the common electrode layer CM of the second substrate 120, wherein micro-structures MS are deposited on a surface 131 of the first alignment layer 130 facing the display medium DM and a surface 141 of the second alignment layer 140 facing the display medium DM. Therefore, in the manufacturing method of the display device, the conventional printing process applied to form the alignment layer may be omitted.

Figure 3A:
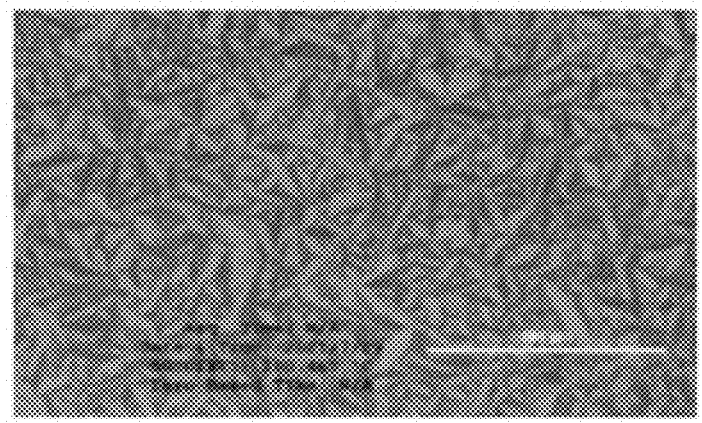
FIG. 3A to FIG. 3C are photographs of a crystal phase of a crystalized display medium obtained at different temperature reduction speeds.
Figure 3B:
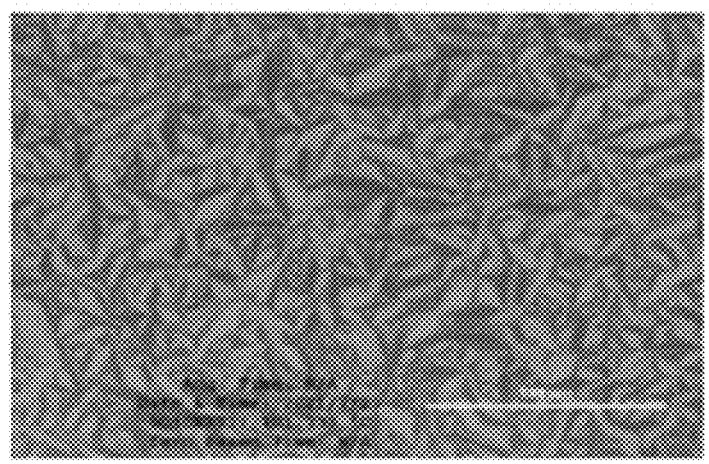
Figure 3C:
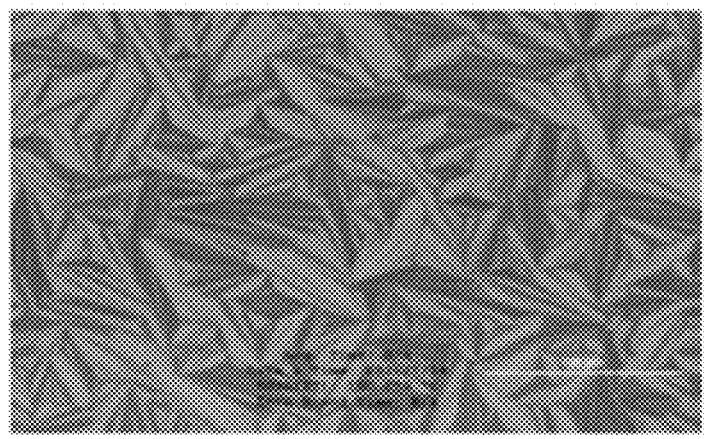

FIG. 3A to FIG. 3C are photographs of a crystal phase of a crystalized display medium obtained at different temperature reduction speeds. It may be observed from FIG. 3A to FIG. 3C that the temperature reduction speed affects the grain size of the crystal phase of the display medium. As shown in FIG. 3A, when the temperature reduction speed is greater than 7° C./min (e.g., about 10° C./min), the domain size is too small, thus resulting in too much scattering in a focal conic state and leading to a high haze level. As shown in FIG. 3B, when the temperature reduction speed is about 5° C./min, a medium grain size of the crystal phase of the display medium may be obtained. As shown in FIG. 3C, when the temperature reduction speed is about 0.5° C./min, a large grain size of the crystal phase of the display medium with a low haze level may be obtained.

The light beam LB applied in the light curing treatment may be non-polarizing light, such as non-polarizing UV light. In some embodiments, a wavelength of the light beam LB may range from 200 nm to 450 nm, e.g., 300 nm, 365 nm, or 420 nm. In some embodiments, the energy of the light beam LB may range from 50 mW/cm$^2$ to 200 mW/cm$^2$, e.g., 80 mW/cm$^2$, 100 mW/cm$^2$, or 150 mW/cm$^2$. In some embodiments, a time period during which the light curing treatment is performed ranges from 50 seconds to 400 seconds, such as 100 seconds, 200 seconds, or 300 seconds. In some embodiments, the total light curing energy consumed in the light curing treatment may range from 10 to 20 joule (J), e.g., 12 J, 15 J, or 18 J. The conditions on which the light curing treatment is performed are not limited to those described above and may be set appropriately according to actual demands.

Figure 4:
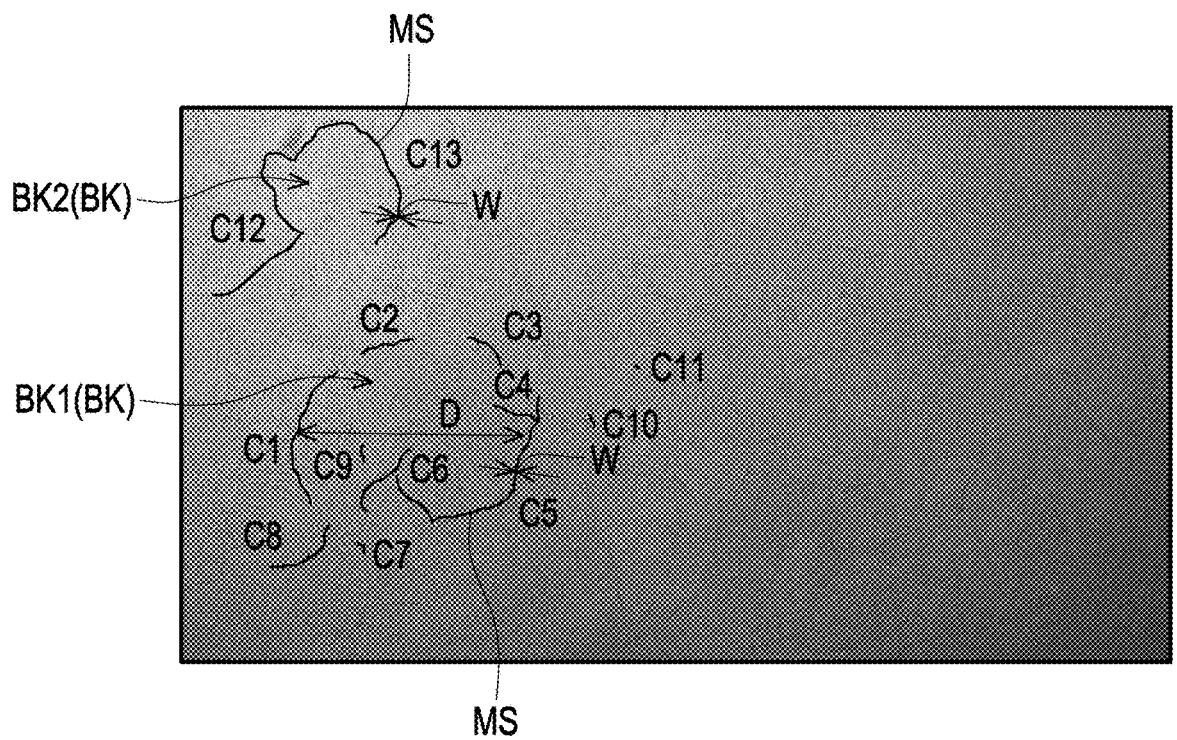
FIG. 4 is a partial enlarged view of a surface of a second alignment layer of a display device according to an embodiment of the disclosure.

FIG. 4 is a partial enlarged view of micro-structures of the display device 10 according to an embodiment of the disclosure With reference to FIG. 2C and FIG. 4, the display device 10 includes: the first substrate 110, the first alignment layer 130 disposed on the first substrate 110, the pixel array layer AR located between the first substrate 110 and the first alignment layer 130, the second substrate 120 disposed opposite to the first substrate 110, the second alignment layer 140 disposed on the second substrate 120, the common electrode layer CM located between the second substrate 120 and the second alignment layer 140, and the display medium DM located between the first alignment layer 130 and the second alignment layer 140. Here, the first alignment layer 130 and the second alignment layer 140 are located between the first substrate 110 and the second substrate 120, and the surfaces 131 and 141 of the first alignment layer 130 and the second alignment layer 140 facing the display medium DM have topographies with irregular areas BK surrounded by the micro-structure MS.

In this embodiment, the micro-structures MS, the first alignment layer 130, and the second alignment layer 140 may be formed by polymerizing the polymerizable monomer RM and depositing and absorbing the polymerizable monomer RM onto the first substrate 110 and the second substrate 120. The micro-structures MS, the first alignment layer 130, and the second alignment layer 140 may include a polymer formed by polymerization of the polymerizable monomer RM, such as an oligomer. The micro-structures MS may protrude from the surface 131 of the first alignment layer 130 and the surface 141 of the second alignment layer 140, and the micro-structures MS may jointly surround and define a plurality of topographies with irregular areas BK. Specifically, each micro-structure MS may include a plurality of particles formed by the polymerization reaction, the micro-structures MS substantially form a wall, and each of the topographies with the irregular areas BK is surrounded by the wall.

In some embodiments, a thickness of the first alignment layer 130 and a thickness of the second alignment layer 140 are equal to or less than 300 Å, such as 150 Å, 220 Å, or 280 Å, and a capacitance of the first alignment layer 130 or a capacitance of the second alignment layer 140 is equal to or less than 10 μF, such as 5 μF or 8 μF, so as to further reduce the power consumption required for driving the display medium DM.

As shown in FIG. 4, the micro-structures MS may be shaped as irregular curves, such as irregular curves C1-C13, wherein lengths of the irregular curves C1-C13 may range from 10 μm to 900 μm, as shown in Table 2 below. For instance, in this embodiment, the irregular curves C1-C13 may surround and define a plurality of topographies with the irregular areas BK; the topographies with the irregular areas BK include a topography with irregular areas BK1 that are jointly surrounded by the irregular curves C1-C6 and another topography with irregular areas BK2 that may be jointly surrounded by the irregular curves C12 and C13, and the topographies with the irregular areas BK1 and BK2 have different shapes. In addition, in some embodiments, widths W of the irregular curves C1-C13 may range from 0.2 µm to 0.4 µm, e.g., 0.3 µm. In some embodiments, a diameter D of the topographies with the irregular areas BK may range from 20 µm to 700 µm, e.g., 50 µm, 200 µm, or 500 µm.

TABLE 2

| Irregular Curve | Length (µm) |
| --- | --- |
| C1 | 309.586 |
| C2 | 103.013 |
| C3 | 102.625 |
| C4 | 96.823 |
| C5 | 499.783 |
| C6 | 175.36 |
| C7 | 28.413 |
| C8 | 166.337 |
| C9 | 37.162 |
| C10 | 29.358 |
| C11 | 13.324 |
| C12 | 222.439 |
| C13 | 720.676 |

Figure 5:
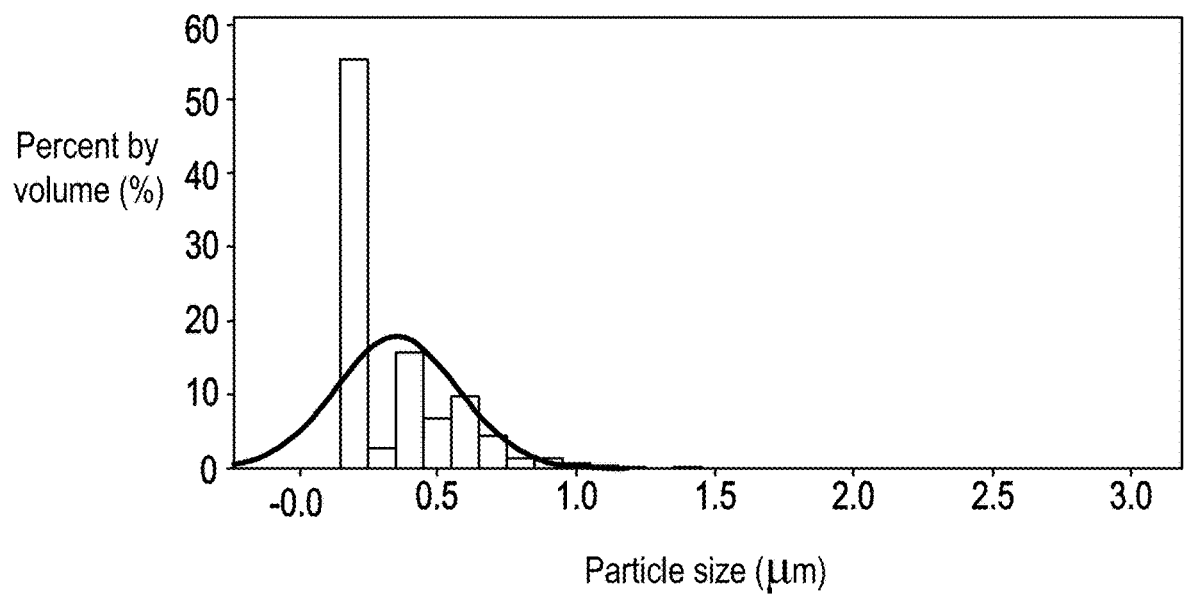
FIG. 5 is a particle size analysis diagram of microstructures according to an embodiment of the disclosure.

FIG. 5 is a particle size analysis diagram of the microstructures MS according to an embodiment of the disclosure. It may be learned from FIG. 5 that the particle size of the polymerizable monomer RM after polymerization is less than 1.0 µm and mostly ranges from 0.2 µm to 0.4 µm.

Figure 6A:
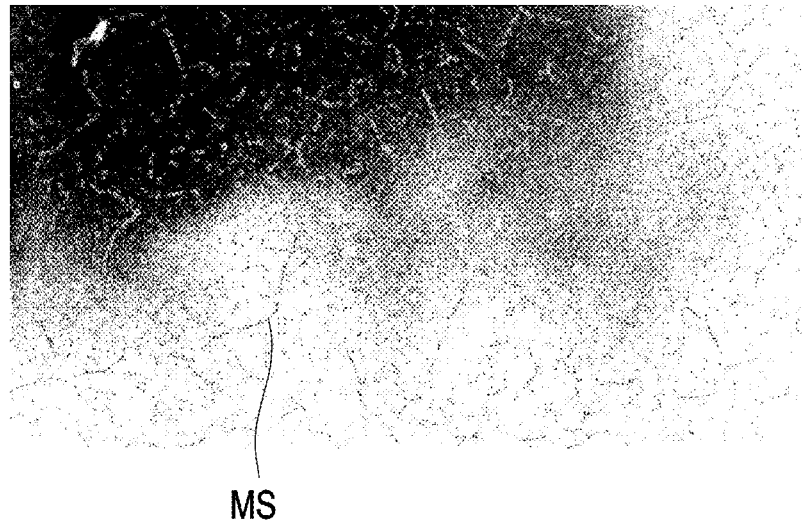
FIG. 6A is a micrograph of a display device in which a display medium is in a homeotropic state according to an embodiment of the disclosure.
Figure 6B:
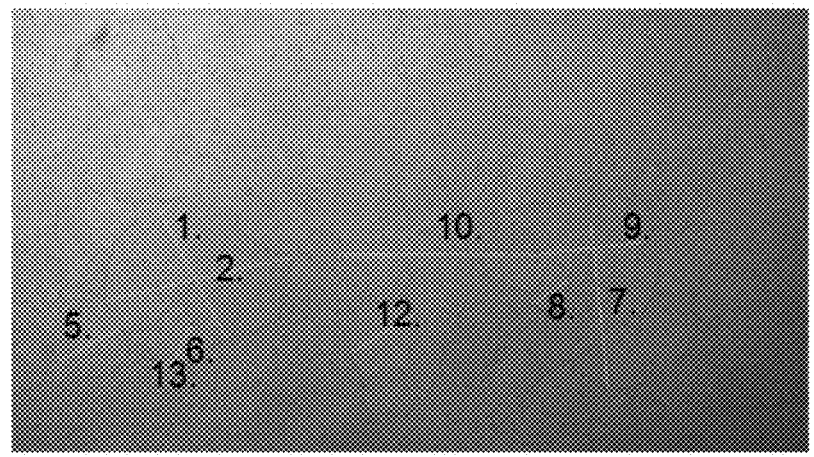
FIG. 6B is a micrograph of a display device in which a display medium is in a planar state according to an embodiment of the disclosure.
Figure 6C:
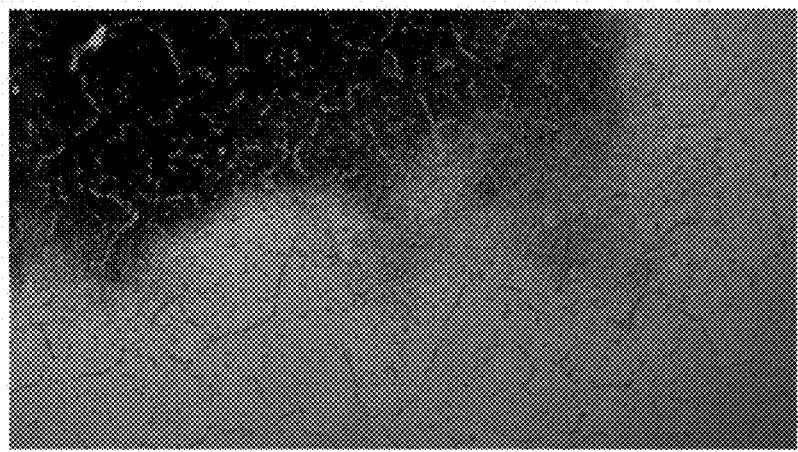
FIG. 6C is an image obtained by overlapping FIG. 6A and FIG. 6B.

FIG. 6A is a micrograph of the display device 10 in which the display medium DM is in a homeotropic state according to an embodiment of the disclosure. FIG. 6B is a micrograph of the display device 10 in which the display medium DM is in a planar state (or referred to as a reflective state) according to an embodiment of the disclosure. FIG. 6C is an image obtained by overlapping FIG. 6A and FIG. 6B. It may be learned from FIG. 6A that the polymerizable monomer RM, which undergoes the light curing treatment, produces white polymers, which are deposited to form the microstructure MS. It may be learned from FIG. 6B and FIG. 6C that the micro-structure MS formed by the polymerization and deposition of the polymerizable monomer RM drives the display medium RM in the planar state to be arranged as blocks in a swirl manner (as shown by numbers 1, 2, 5-10, and 12-13) in the drawings, and these micro-structure MS also affect the crystal phase of the display medium RM in the planar state and the focal conic state.

Figure 6D:
FIG. 6D is a micrograph of a display device in which a display medium is in a focal conic state according to an embodiment of the disclosure.
Figure 6E:
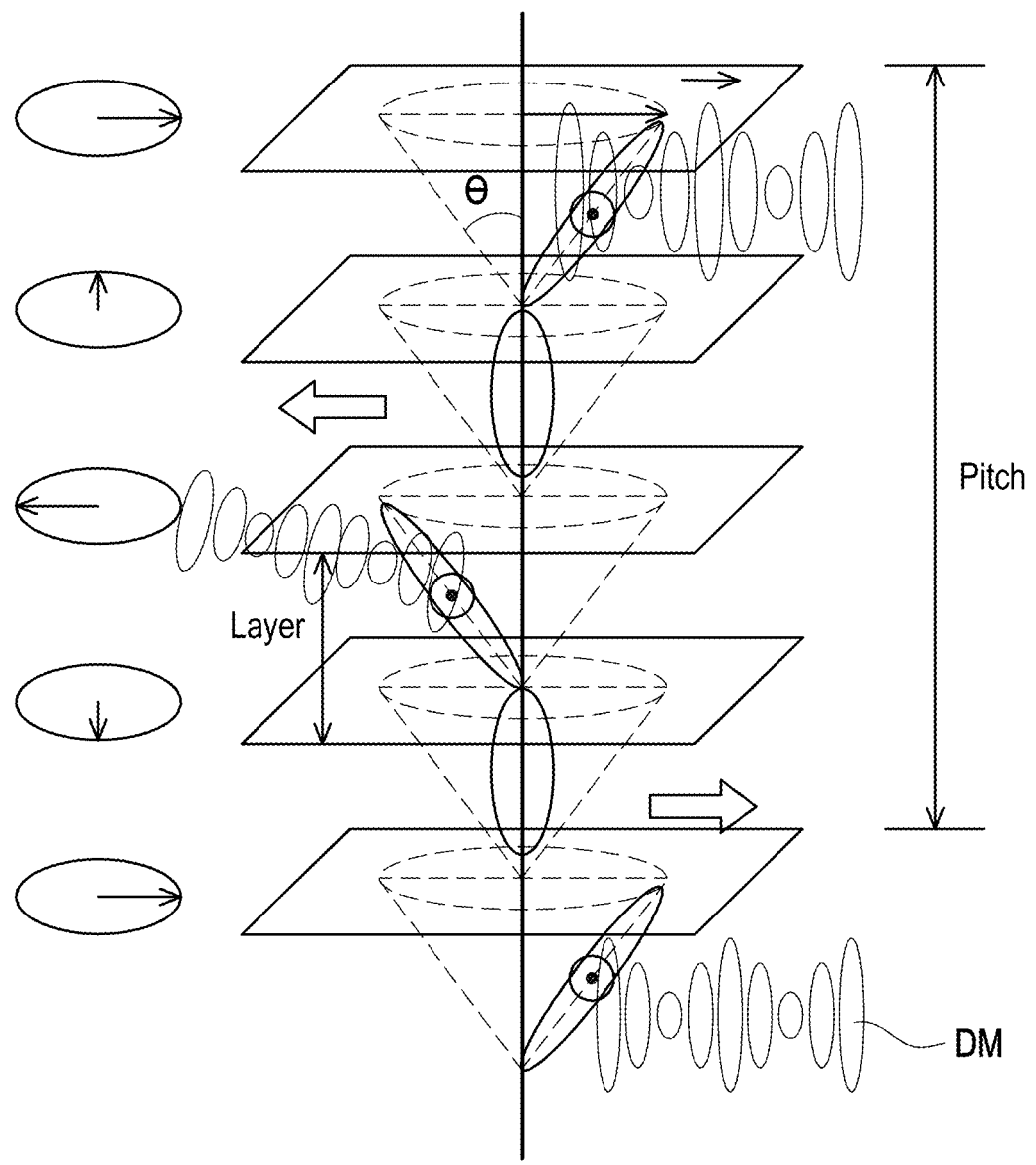
FIG. 6E is a schematic view of arrangement in a display device in which a display medium is in a focal conic state according to an embodiment of the disclosure.

FIG. 6D is a micrograph of the display device 10 in which the display medium DM is in a focal conic state according to an embodiment of the disclosure. FIG. 6E is a schematic view of arrangement in the display device 10 in which the display medium DM is in a focal conic state according to an embodiment of the disclosure. It may be learned from FIG. 6D that traces of aggregation of the polymerizable monomer may limit the alignment of the display medium (e.g., arrangement of the LC molecules), thereby leading to a rather transparent state. It may be learned from FIG. 6E that the display medium DM in the focal conic state is arranged in a fan shaped-smectic manner and appears to be transparent.

In addition, a response time of the display medium of the display device 10 in different states is measured, and the measured results are listed in Table 3 below. It may be observed from Table 3 that, compared with Comparative Example 1, where the alignment layer is formed without applying any polymerizable monomer, Embodiment 1 provided herein discloses the apparent reduction of the response time for the display medium to convert from the homeotropic state to the planar state, and the response time from the homeotropic state to the planar state and the response time from the planar state to the homeotropic state are merely 17.88 ms, which may satisfy the active driving requirement for the sum of the response time from the homeotropic state to the planar state and from the planar state to the homeotropic state to be less than 42 ms. In Embodiment 2, the weight percentage of the polymerizable monomer is reduced, which may also satisfy the active driving requirement for the sum of the response time from the homeotropic state to the planar state and from the planar state to the homeotropic state to be less than 42 ms. More preferably, Embodiments 1 and 2 may satisfy the active driving requirement for the sum of the response time from the homeotropic state to the planar state and from the planar state to the homeotropic state to be less than 20 ms.

TABLE 3

| | | Embodiment 1 | Embodiment 2 | Comparative Example 1 |
| --- | --- | --- | --- | --- |
| Display Medium | | ZAU-5717 | ZAU-5717 | ZAU-5717 |
| Polymerizable Monomer (wt %) | | 1.8 | 0.3 | 0 |
| Response Time (ms) | Planar State →Homotropic State | 3.9 | 4.25 | 3.7 |
| | Homotropic State → Planar State | 13.98 | 12.58 | 47.55 |

To sum up, in the manufacturing method of the display device provided in one or more embodiments of the disclosure, the alignment layers are formed by applying the display medium composition including the polymerizable monomer, so as to omit the conventional printing process applied to form the alignment layer, and the resultant alignment layers not only have the improved transparency while the display device is in the dark state but also have the significantly reduced response time during which the display medium is converted from the homeotropic state to the planar state, so that the display device provided herein may achieve active driving.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A manufacturing method of a display device, comprising:

providing a panel comprising a first substrate, a second substrate, and a display medium composition, wherein the display medium composition is located between the first substrate and the second substrate, and the display medium composition comprises a display medium and a polymerizable monomer;

performing a heat treatment on the panel, wherein a temperature at which the heat treatment is performed is higher than a temperature at which the display medium is transformed into an isotropic liquid; and after the heat treatment is performed on the panel and a temperature of the panel is reduced, performing a light curing treatment on the panel, wherein an light beam is applied in the light curing treatment;

an energy of the light beam ranges from 80 mW/cm$^2$ to 200 mW/cm$^2$, so that surfaces of a first alignment layer and a second alignment layer facing the display medium have topographies with irregular areas surrounded by the micro-structures, wherein the first alignment layer and the second alignment layer are respectively formed on the first substrate and the second substrate.

2. The manufacturing method according to claim 1, wherein a speed of reducing the temperature of the panel is less than 7° C./min.

3. The manufacturing method according to claim 1, wherein a temperature at which the light curing treatment is performed ranges from 20° C. to 60° C.

4. The manufacturing method according to claim 1, wherein the light curing treatment is performed by applying non-polarizing light.

5. The manufacturing method according to claim 4, wherein a wavelength of the non-polarizing light ranges from 200 nm to 450 nm.

6. The manufacturing method according to claim 1, wherein a time period during which the light curing treatment is performed ranges from 50 seconds to 400 seconds.

7. The manufacturing method according to claim 1, wherein a weight percentage of the polymerizable monomer in the display medium composition ranges from 0.2 wt % to 2.0 wt %.

8. The manufacturing method according to claim 1, wherein the polymerizable monomer comprises an acrylate group and a phenyl group.

9. The manufacturing method according to claim 8, wherein the polymerizable monomer is selected from following compounds or a combination thereof:

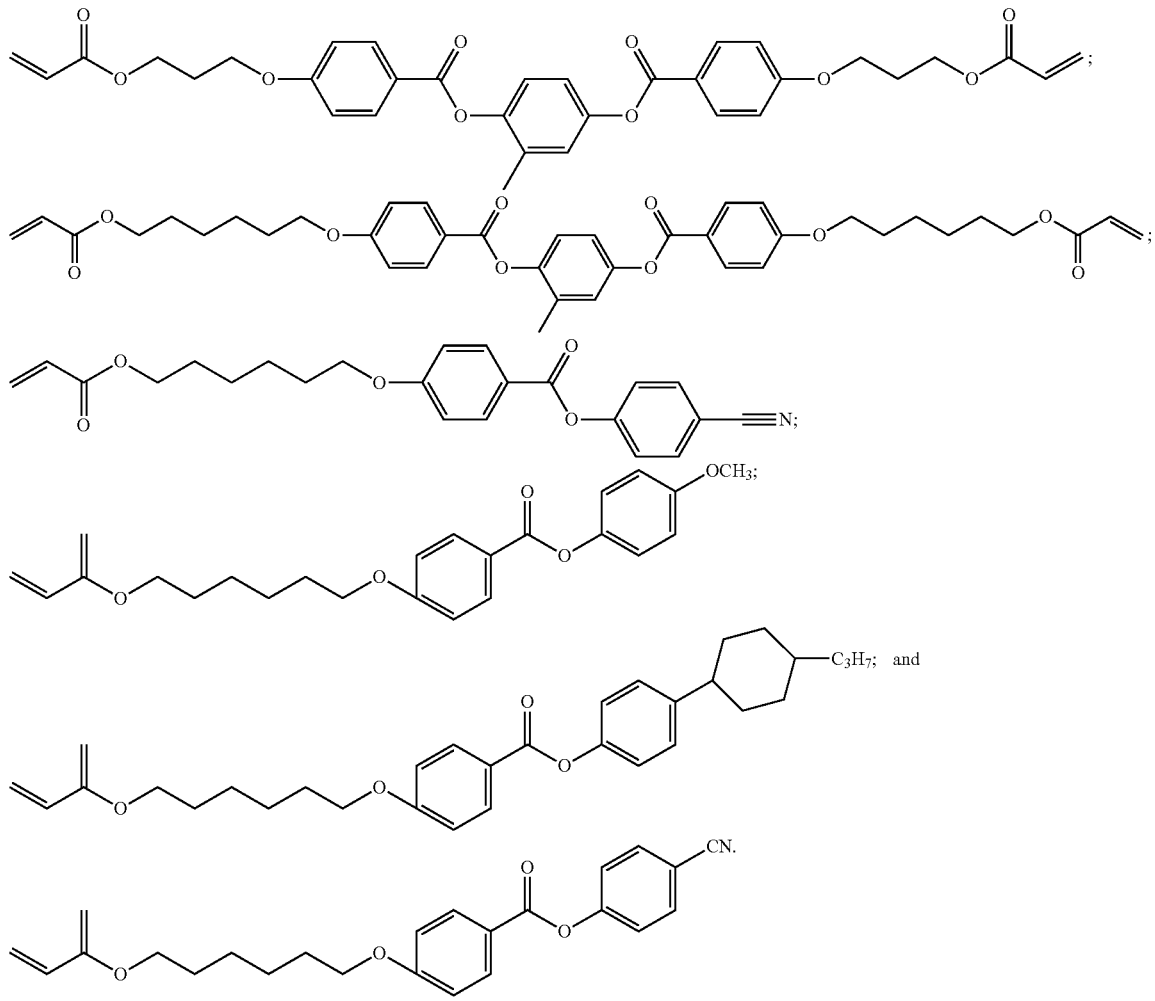

10. The manufacturing method according to claim 1, wherein a speed of reducing the temperature of the panel is substantially 0.5° C./min.

11. A display device, comprising:
a panel comprising a first substrate, a second substrate, and a display medium, wherein the display medium is located between the first substrate and the second substrate;
wherein the panel is subjected to a heat treatment performed a temperature higher than a temperature at which the display medium is transformed into an isotropic liquid, and is subjected to a light curing treatment after the heat treatment and a temperature thereof is reduced, wherein an light beam is applied in the light curing treatment, and an energy of the light beam ranges from 80 mW/cm² to 200 mW/cm² so that surfaces of a first alignment layer and a second alignment layer facing the display medium have topographies with irregular areas surrounded by the microstructures, a diameter of the topographies with the irregular areas ranges from 20 μm to 700 μm, wherein the first alignment layer and the second alignment layer are respectively formed on the first substrate and the second substrate, the first alignment layer and the second alignment layer are located between the first substrate and the second substrate, and the display medium is located between the first alignment layer and the second alignment layer.

* * * * *